(12) United States Patent
Hojeij et al.

(10) Patent No.: US 10,257,791 B2
(45) Date of Patent: Apr. 9, 2019

(54) METHOD AND APPARATUS FOR POWER AND USER DISTRIBUTION TO SUB-BANDS IN NOMA SYSTEMS

(71) Applicants: INSTITUT MINES-TELECOM / TELECOM BRETAGNE, Brest (FR); Université Libanaise, Beirut (LB); Université Saint-Esprit de Kaslik, Jounieh (LB)

(72) Inventors: Marie-Rita Hojeij, Mont Liban (LB); Joumana Farah, Mont Liban (LB); Charbel Abdel Nour, Brest (FR); Catherine Douillard, Brest (FR)

(73) Assignees: INSTITUT MINES-TELECOM / TELECOM BRETAGNE, Brest (FR); UNIVERSITÉ LIBANAISE, Beirut (LB); UNIVERSITÉ SAINT-ESPRIT DE KASLIK, Jounieh (LB)

( * ) Notice: Subject to any disclaimer, the term of this patent is extended or adjusted under 35 U.S.C. 154(b) by 0 days.

(21) Appl. No.: 15/652,644

(22) Filed: Jul. 18, 2017

(65) Prior Publication Data

US 2018/0027507 A1 Jan. 25, 2018

(30) Foreign Application Priority Data

Jul. 19, 2016 (EP) .................................... 16305929

(51) Int. Cl.
*H04W 52/22* (2009.01)
*H04W 52/34* (2009.01)
(Continued)

(52) U.S. Cl.
CPC ....... *H04W 52/346* (2013.01); *H04W 52/225* (2013.01); *H04W 72/0446* (2013.01);
(Continued)

(58) Field of Classification Search
CPC .................. H04W 52/225; H04W 72/0473
(Continued)

(56) References Cited

U.S. PATENT DOCUMENTS 8,355,360 B2 * 1/2013 Yang .................. H04W 52/143
370/318
2003/0151799 A1 * 8/2003 Wight .................. H01S 3/2383
359/334
(Continued)

OTHER PUBLICATIONS

European Search Report for 16305929.8 dated Dec. 14, 2016.
(Continued)

*Primary Examiner* — John J Lee
(74) *Attorney, Agent, or Firm* — Meagher Emanuel Laks Goldberg & Liao, LLP

(57) ABSTRACT

Power allocation in NOMA systems for example on the basis Proportional Fairness calculations depends on knowledge of user throughput on a specified sub-band, which implies that users have already been allocated to particular sub-bands. Meanwhile, maximum throughput can generally be achieved where there is the greatest possible difference in transmission power for the users on a given sub-band, so that optimal allocation of users to sub-bands requires knowledge of the power available for each user. A mechanism is proposed based on iteratively applying a waterfilling algorithm to distribute power across a progressive subset of sub-bands to provisionally distribute the power budget across that subset of sub-bands, where at each iteration the water filling algorithm is carried out for each possible combination of users assignable to the newly considered sub-band using a floor for that sub band proportional to the reciprocal of the square of the highest channel gain value of any user in that combination, and calculating a throughput for that combination with the corresponding power attribution, whereby the combination retained for the next iteration (Continued)

(with an additional sub-band) is whichever gives the highest throughput. This process is thus repeated until users are assigned to all sub-bands, whereupon power allocations from the last iteration are definitive.

9 Claims, 9 Drawing Sheets

(51) Int. Cl.
  *H04W 72/04* (2009.01)
  *H04W 52/24* (2009.01)
  *H04W 52/26* (2009.01)
  *H04W 52/36* (2009.01)

(52) U.S. Cl.
  CPC ...... *H04W 72/0473* (2013.01); *H04W 52/242* (2013.01); *H04W 52/267* (2013.01); *H04W 52/367* (2013.01)

(58) Field of Classification Search
  USPC .................. 455/522, 69, 452.1, 509, 67.11
  See application file for complete search history.

(56) References Cited

U.S. PATENT DOCUMENTS

| | | | |
|---|---|---|---|
| 2011/0158156 A1* | 6/2011 | Ma | H04B 7/15542 370/315 |
| 2016/0073409 A1* | 3/2016 | Chen | H04L 5/0037 370/329 |

OTHER PUBLICATIONS

Hojeij Marie-Rita et al: "New Optimal and Suboptimal Resource Allocation Techniques for Downlink Non-orthogonal Multiple Access", Wireless Personal Communications, Springer, Dordrecht, NL, vol. 87, No. 3, May 10, 2015 (May 10, 2015), pp. 837-867.

Kenichi Higuchi et al: "Non-orthogonal Multiple Access (NOMA) with Successive Interference Cancellation for Future Radio Access", IEICE Transactions on Communications., vol. E98.B, No. 3, Mar. 1, 2015 (Mar. 1, 2015), pp. 403-414.

Saito Yuya et al: "System-level evaluation of downlink non-orthogonal multiple access (NOMA) for non-full buffer traffic model", 2015 IEEE Conference on Standards for Communications and Networking (CSCN), IEEE, Oct. 28, 2015 (Oct. 28, 2015), pp. 94-99.

Y. Endo, Y. Kishiyama, and K. Higuchi "Uplink non-orthogonal access with MMSE-SIC in the presence of inter-cell interference" in proc. 2012 IEEE Int. Symp. on. Wireless Commun. Syst, 2012.

N. Otao, Y. Kishiyama, and K. Higuchi, "Performance of non-orthogonal access with SIC in cellular downlink using proportional fair-based resource allocation", in proc. Int. Symp. on Wireless Commun. Syst.,2012, pp. 476-480.

Y. Saito, A. Benjebbour, Y. Kishiyama, and T. Nakamura "System-Level Performance of Downlink Non-orthogonal Multiple Access (NOMA) Under Various Environments" in proc. IEEE 81st VTC, 2015.

A. Benjebbour, A. Li, Y. Kishiyama, H. Jiang, and T. Nakamura, "System-Level Performance of Downlink NOMA Combined with SU-MIMO for Future LTE Enhancements", in proc. IEEE Globecom, Dec. 2014.

Y. Saito, A. Benjebbour, Y. Kishiyama, and T. Nakamura, "System-level performance evaluation of downlink non-orthogonal multiple access (NOMA)", in proc. IEEE PIMRC, Sep. 2013.

Benjebbour, Y. Saito, Y. Kishiyama, A. Li, A. Harada, A, and T. Nakamura, "A Concept and practical considerations of non-orthogonal multiple access (NOMA) for future radio access", in proc. Int. Symp. on Intelligent Signal Process. and Commun. Syst. (ISPACS), 2013.

D. Tse, and P. Viswanath "Fundamentals of Wireless Communication", Cambridge University Press, 2005.

KR Office Action issued in corresponding KR application No. 10-2017-0091208 dated Jun. 12, 2018.

Chang, Sunny and Kim, Seong-Lyun, "Distributed Multi-User Water-Filling in Uplink OFDMA Systems." IEEK Communications Society Fall Conference & Workshop 2007, vol. 30., No. 2 (Nov. 2007).

\* cited by examiner

METHOD AND APPARATUS FOR POWER AND USER DISTRIBUTION TO SUB-BANDS IN NOMA SYSTEMS

FIELD OF THE INVENTION

The present invention relates to the attribution of power in Non-Orthogonal Multiple Access (NOMA) communications systems.

BACKGROUND OF THE INVENTION

With the proliferation of internet applications, it is expected that the mobile traffic volume supported by communication networks by 2020 will be almost 500 times larger than that supported today. To respond favourably to such constraints while keeping a high level of user quality of experience, system capacity and user fairness should be largely improved for the future 5th generation (5G) mobile communication systems. To this end, Non-Orthogonal Multiple Access (NOMA) has recently emerged as a promising candidate for future radio access. By exploiting an additional multiplexing domain, the power domain, NOMA allows the cohabitation of multiple users per sub-band at the transmitter side, on top of the Orthogonal Frequency Division Multiplexing (OFDM) layer, and relies on Successive Interference Cancellation (SIC) at the receiver side. An attractive feature of NOMA is that it targets the improvement of system capacity while achieving user fairness. Therefore, most of the prior art dealing with NOMA considers the proportional fairness (PF) scheduler as a multiuser scheduling scheme for the trade-off between total user throughput and the user fairness that it provides. Several power allocation algorithms, jointly implemented with a NOMA-based PF scheduler, have been proposed in recent research literature.

In "Uplink non-orthogonal access with MMSE-SIC in the presence of inter-cell interference" by Y. Endo, Y. Kishiyama, and K. Higuchi, in proc. 2012 IEEE Int. Symp. on Wireless Commun. Syst. 2012, an inter-cell interference-aware transmission and power control mechanism is proposed and conducted in two steps, followed by user selection based on the PF metric. In the first step, the transmission power of a user per sub-band is determined by the fractional transmit power control (FTPC) used in LTE. The power is then updated in a second step by taking into consideration the candidate set of scheduled users. Simulation results show that NOMA combined with the proposed power allocation greatly enhances the system-level throughput, compared to orthogonal access.

In "System-Level Performance of Downlink Non-orthogonal Multiple Access (NOMA) Under Various Environments" by Y. Saito, A. Benjebbour, Y. Kishiyama, and T. Nakamura in proc. IEEE 81st VTC, 2015, the system level-performance of downlink NOMA in small cells is investigated, where the full search power allocation scheme in "System-Level Performance of Downlink NOMA Combined with SUMIMO for Future LTE Enhancements", by A. Benjebbour, A. Li, Y. Kishiyama, H. Jiang, and T. Nakamura, in proc. IEEE Globecom, December 2014 is conducted within the PF scheduler, in order to select the best combination of user pairs and power allocations. Some of the recently proposed power allocation algorithms for NOMA do not consider an equal inter-sub-band power distribution, while others propose different multi-user power allocation schemes with an equal distribution of power among sub-bands.

In "System-level performance evaluation of downlink non-orthogonal multiple access (NOMA)", by Y. Saito, A. Benjebbour, Y. Kishiyama, and T. Nakamura, in proc. IEEE PIMRC, September 2013, and "A Concept and practical considerations of non-orthogonal multiple access (NOMA) for future radio access", by. Benjebbour, Y. Saito, Y. Kishiyama, A. Li, A. Harada, A, and T. Nakamura, in proc. Int. Symp. on Intelligent Signal Process. and Commun. Syst. (ISPACS), 2013, the fractional transmit power allocation (FTPA) is introduced in order to split power among multiplexed users, while power per sub-band is considered to be constant over all frequency blocks. In "Performance of non-orthogonal access with SIC in cellular downlink using proportional fair-based resource allocation", N. Otao, Y. Kishiyama, and K. Higuchi, in proc. Int. Symp. on Wireless Commun. Syst., 2012, pp. 476-480., power is also maintained constant for all sub-bands, but an optimal power allocation method based on iterative waterfilling is used to allocate power among scheduled users on each sub-band.

If a downlink system with single transmitter and receiver antenna is considered, the system consists of K users per cell, with a total system bandwidth B divided into S sub-bands, and a maximum allowable transmit power Pmax by the Base Station. Among the K users, a set of users $U_s=\{k_1, k_2, \ldots, k_n, \ldots, k_{n(s)}\}$, is selected to be scheduled over each frequency sub-band s, $(1 \le s \le S)$. n(s) indicates the number of users non-orthogonally scheduled at sub-band s. The SIC process as described in Fundamentals of Wireless Communication, Cambridge University Press, 2005 by D. Tse, and P. Viswanath, is conducted at the receiver side, and the optimum order for user decoding is in the increasing order of the users' channel gains normalized by the noise and inter-cell interference $$\frac{h_{s,k_n}^2}{n_{s,k_n}}$$

where $h_{s,k_n}^2$ is the equivalent channel gain, at sub-band s, between user $k_n$ and the BS, and $n_{s,k_n}$ the average power of the received Gaussian noise plus intercell interference by user $k_n$. Assuming successful decoding and no SIC error propagation, and supposing that inter-cell interference is randomized such that it can be considered as white noise, the throughput of user $k_n$, at sub-band s, $R_{s,k_n}$, is given by:

$$R_{s,k_n} = \frac{B}{S} \log_2\left(1 + \frac{h_{s,k_n}^2 P_{s,k_n}}{\sum_{j \in N_s, \frac{h_{s,k_n}^2}{n_{s,k_n}} < \frac{h_{s,k_j}^2}{n_{s,k_{nj}}}} h_{s,k_n}^2 P_{s,k_j} + n_{s,k_n}}\right) \quad (1)$$

The transmit power allocation constraint is represented by $$\sum_{s=1}^{S} P_s = P_{max}, \text{ with } P_s = \sum_{n=1}^{n(s)} P_{s,k_n} \quad (2)$$

Where $P_s$ denotes the amount of allocated power on sub-band s.

Since the scheduler in NOMA may allocate a sub-band to more than one user simultaneously, the user scheduling policy and the power allocation algorithm largely affect system efficiency and user fairness. A "Proportional Fairness" (PF) scheduler is known to achieve a good trade-off between these two metrics.

The objective of the PF scheduler is to maximize the logarithmic sum of user throughputs or, equivalently, long term averaged user rates, in order to ensure balance between cell throughput and user fairness. This scheduling policy has been adopted in the majority of proposed NOMA implementations. The scheduling algorithm keeps track of the average throughput $T_k(t)$ of each user in a past window of length $t_c$, where $t_c$ defines the throughput averaging time window (number of simulated subframes). $T_k(t)$ is defined as:

$$T_k(t+1) = \left(1 - \frac{1}{t_c}\right)T_k(t) + \frac{1}{t_c}\sum_{s=1}^{S} R_{s,k}(t) \quad (3)$$

where $R_{s,k}(t)$ represents the throughput of user k on sub-bands, at time instance t. This is calculated based on Eq. (1) above, and can equal zero if user k is not scheduled on sub-band s.

For each sub-band s, all possible candidate user sets are considered, and the set of scheduled users $U_s$ is chosen in such a way to maximize the PF scheduling metric:

$$U_s = \underset{U}{\operatorname{argmax}} \sum_{k \in U} \frac{R_{s,k|U}(t)}{T_k(t)} \quad (4)$$

A difficulty with this approach is that power allocation on the basis for example of the Proportional Fairness calculation depends on knowledge of user throughput on a specified sub-band, which implies that users have already been allocated to particular sub-bands. Meanwhile, in NOMA systems, maximum throughput can generally be achieved where there is the greatest possible difference in transmission power for the users on a given sub-band, so that optimal allocation of users to sub-bands requires knowledge of the power available for each user. Accordingly, the considerations are mutually interdependent. It is desirable to identify a mechanism for resolving this tension and providing a method for a more optimal attribution of sub-bands and data rates resulting in improved overall data throughput.

SUMMARY OF THE INVENTION

In accordance with a first aspect there is provided a device for distributing a transmission power budget amongst a plurality of sub-bands in a transmission system, the device being adapted to:
select one sub-band for consideration,
determine every possible combination of users assignable to the sub-band under consideration;
assess each possible combination of users assignable to the sub-band under consideration
to select the channel gain value of the user in that combination having the highest channel gain,
to determine a sub-band attenuation value proportional to the reciprocal of the square of the selected channel gain value;
to apply a water filling algorithm across said selected sub-band and every sub-band selected previously using a floor for each said sub-band defined by the respective sub-band attenuation value,
to calculate a provisional power allocation from the water filling algorithm for the selected sub-band, and
to calculate a performance metric with the provisional power attribution;
and to attribute to the selected sub-band whichever combination of users in order to optimise the performance metric. The device is further adapted to then select a further sub-band and to repeat the operations of assessing for each possible combination of users attributing to said sub-band whichever said combination of users optimises said performance metric, until all sub-bands have been considered, and to calculate a final power allocation for each sub-band from the last iteration of the water filling algorithm corresponding to the combination of users selected for each sub-band.

In accordance with a second aspect, there is provided a method of distributing a transmission power budget amongst a plurality of sub-bands in a transmission system. The method comprises the steps of:
selecting one sub-band for consideration;
determining every possible combination of users assignable to the sub-band under consideration;
assessing each possible combination of users assignable to the sub-band under consideration
to select the channel gain value of the user in that combination having the highest channel gain,
to determine a sub-band attenuation value proportional to the reciprocal of the square of the selected channel gain value;
to apply a water filling algorithm across the selected sub-band and every sub-band selected previously using a floor for each said sub-band defined by the respective the sub-band attenuation value,
to calculate a provisional power allocation from the water filling algorithm for the selected sub-band, and
to calculate a performance metric with the provisional power attribution;
and attributing to the selected sub-band whichever combination of users optimises the performance metric. The method comprising the further steps of selecting a further said sub-band and repeating the steps of assessing for each said possible combination of users and attributing to the sub-band whichever said combination of users optimises said performance metric until all sub-bands have been considered, and calculating a final power allocation for each sub-band from the last iteration of the water filling algorithm corresponding to the combination of users selected for each sub-band.

In a development of the first aspect at the step of calculating a provisional power allocation from the water filling algorithm for the selected sub-band, a provisional power allocation is further calculated for each sub-band selected previously from the water filling algorithm.

In a development of the first aspect, after the step of attributing to said selected sub-band whichever combination of users optimises the performance metric; the method comprises a further step of calculating a provisional power allocation for each sub-band selected previously from said water filling algorithm corresponding to the combination of users selected for each sub-band.

In a further development of the first aspect, the sub-band attenuation value is equal to the total transmission bandwidth multiplied by the Noise power spectral density, divided by the square of the selected channel gain value multiplied by the total number of the sub-bands.

In a further development of the first aspect, the performance metric is a throughput value or a fairness metric or a combination of both throughput and fairness metrics.

In a further development of the first aspect, in a first iteration of said steps of determining every possible combination of users, selecting the channel gain value, determining every possible combination of users;

assessing for each said possible combination of users; and attributing to said sub-band whichever said combination of users optimises the performance metric;

at said step of assessing, the total power budget is assigned to the sub-band under consideration for each possible combination of users assignable to the sub-band under consideration.

In accordance with a third aspect there is provided a computer program adapted to implement the steps of the second aspect.

In accordance with a fourth aspect there is provided a computer readable medium incorporating the computer program of the fourth aspect.

BRIEF DESCRIPTION OF THE DRAWINGS

The above and other advantages of the present invention will now be described with reference to the accompanying drawings, in which.

DETAILED DESCRIPTION

In order to further improve the achieved system throughput in NOMA, the problem of optimally distributing the total power among sub-bands should be addressed.

Figure 1:
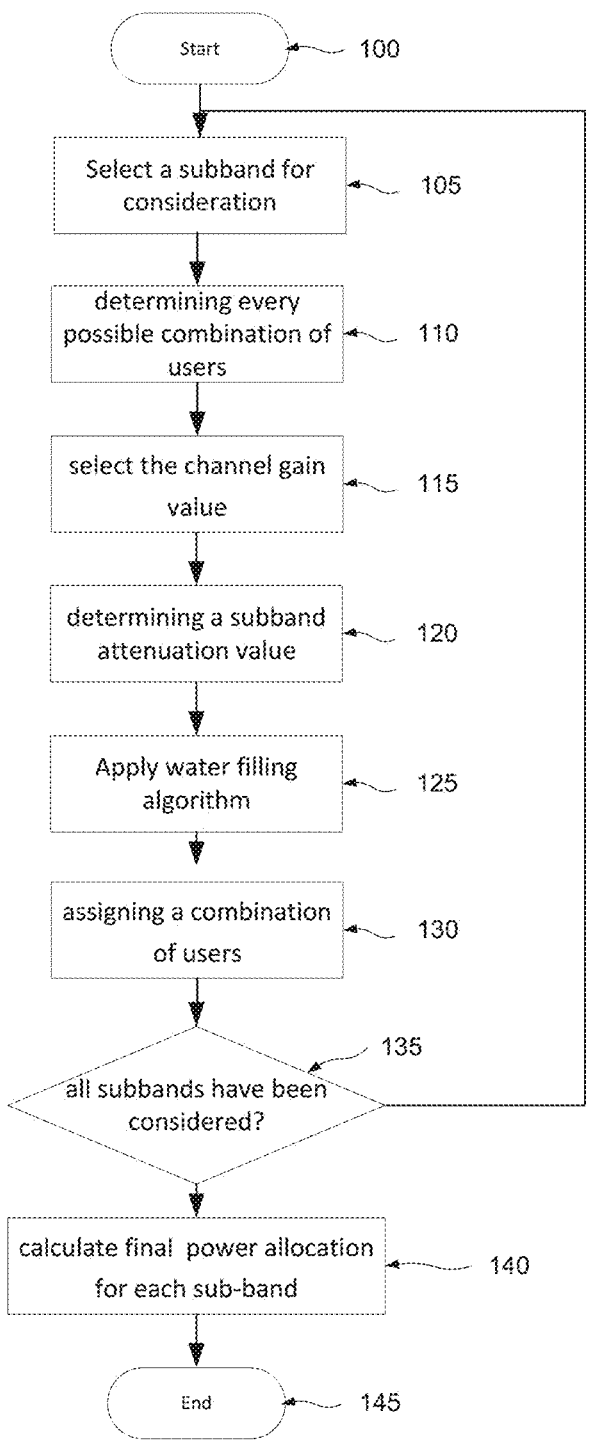
FIG. 1 shows the steps of a method according to an embodiment.

FIG. 1 shows the steps of a method according to an embodiment.

Specifically, the method of FIG. 1 implements a method of distributing an available transmission power budget amongst a plurality of sub-bands in a transmission system.

As shown in FIG. 1, the method starts at step 100, before proceeding to step 105 at which a sub-band is selected for consideration. The sub-band selected may be any of the sub-bands defined in the system, since in accordance with the present embodiment the sub-bands may be considered in any order.

From step 105, the method proceeds to step 110, at which every possible combination of users is determined for the sub-band under consideration.

Figure 2:
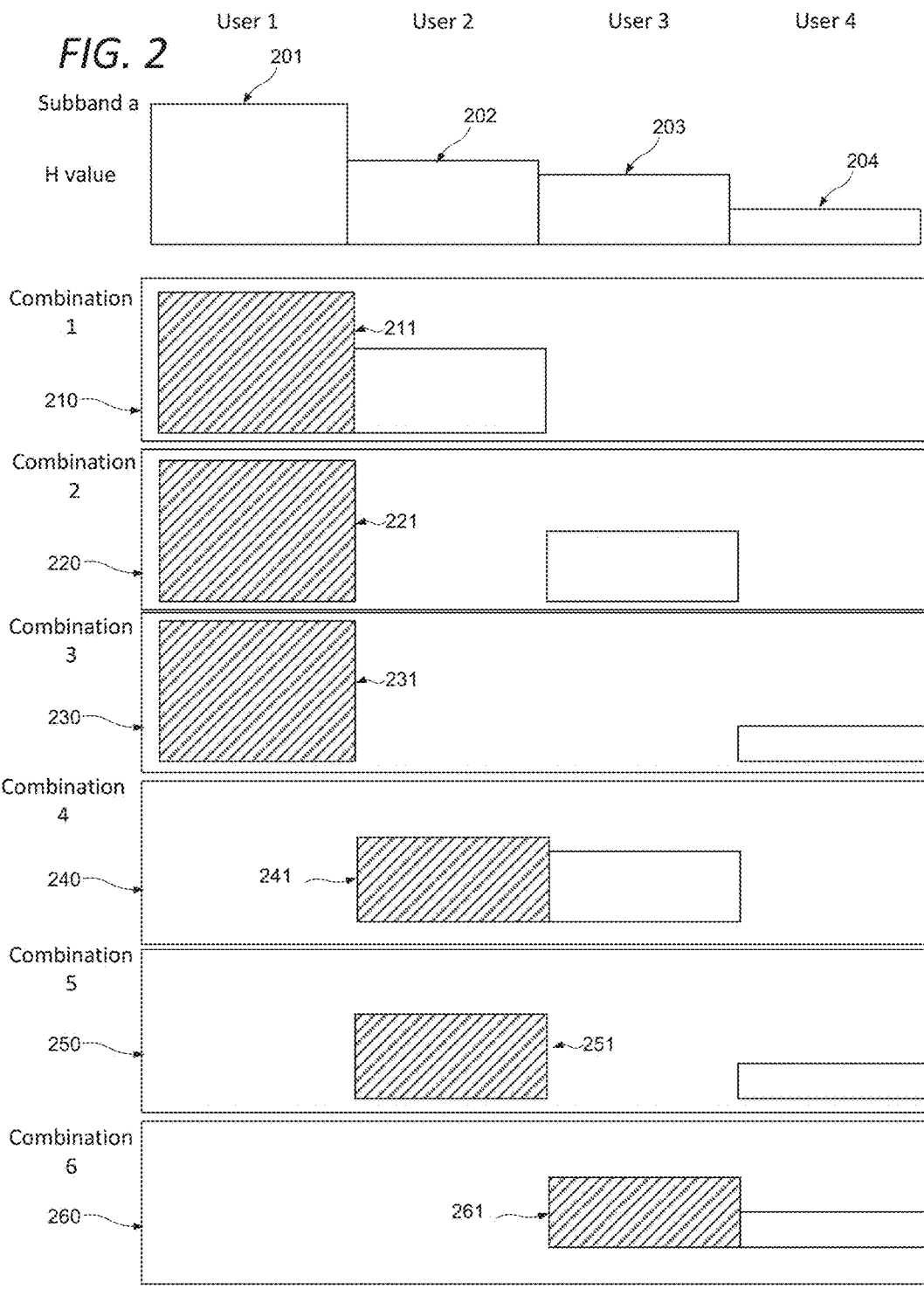
FIG. 2 illustrates aspects of the method of FIG. 1.

FIG. 2 illustrates aspects of the method of FIG. 1.

As shown in FIG. 2, there are defined 4 users for illustration purposes only. There may indeed be any number of candidate users to consider at this stage.

In accordance with the method of FIG. 1, each possible combination of users assignable to the sub-band under consideration as determined at step 100 is now determined at step 110.

In some implementations, the number of users that may be assigned to any one sub-band may be fixed or capped, or may be determined freely in order to optimize a performance metric.

In particular, the number of users that might be assigned to any sub-band may be extended beyond two. The waterline calculation will remain the same, based on the highest channel gain among scheduled users for a possible candidate user set. Nevertheless, the number of possible combinations for any sub-band will grow dramatically as the possible number of users per sub-band increases. The gain obtained when 3 users are scheduled per sub-band is around 1% compared to 2 users per sub-band, as demonstrated by Y. Saito, A. Benjebbour, Y. Kishiyama, and T. Nakamura, in "System-level performance evaluation of downlink non-orthogonal multiple access (NOMA)», IEEE PIMRC, September 2013. Therefore, in our evaluations, the maximum number of scheduled users will often be limited to 2.

In any case, typically two users may be assigned to each sub-band, and for the purposes of the implementation discussed by way of example below, it is assumed that this is the case.

Each of the users 1, 2, 3 and 4 has a respective channel gain value 201, 202, 203, 204. As shown user 1 has the highest channel gain or "h" value, user 2 has the next highest, user 3 has the next highest and user 4 has the lowest channel gain value. In 3G and 4G systems, a parameter is generally fed back from the receiver to the transmitter with information regarding the quality of the channel. This can be treated in accordance with some embodiments of the present invention as an indicator of the channel gain value, and it is presumed that implementations of NOMA in accordance with the present invention will provide some analogous mechanism.

As shown in FIG. 2, if there are four users 1, 2, 3 and 4, of which any two may be assigned to the channel under consideration, there are six possible combinations: combination 210 comprising user 1 and 2, combination 220 comprising user 1 and 3, combination 230 comprising user 1 and 4, combination 240 comprising user 2 and 3, combination 250 comprising user 2 and 4, and combination 260 comprising user 3 and 4.

Figure 4:
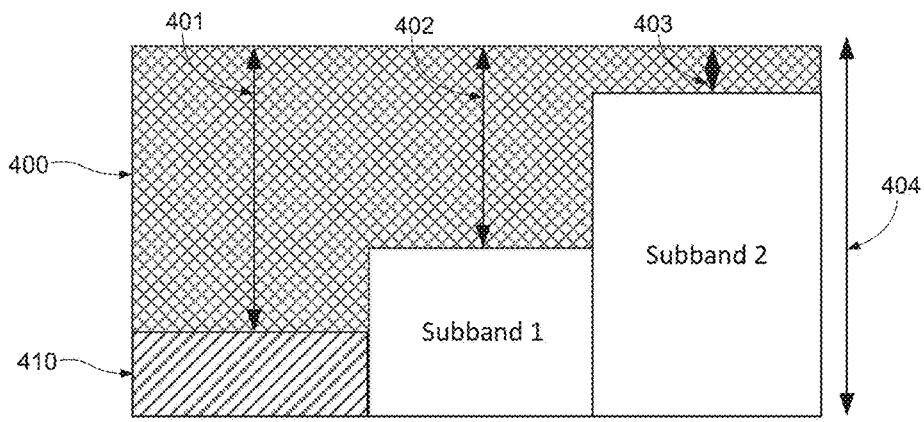
FIG. 4 demonstrates the application of the water filling approach in accordance with the method of FIG. 1 for a first user combination scenario.

In accordance with the method of FIG. 1, the method proceeds from step 110 to step 115 at which the channel gain value of the user in each that combination having the highest channel gain is selected. Thus as shown in FIG. 4, for combination 210 the highest channel gain value 211, corresponding to the channel gain of user 1 is selected, for combination 220 the highest channel gain value 221, corresponding to the channel gain of user 1 is selected, for combination 230 the highest channel gain value 231, corresponding to the channel gain of user 1 is selected, for combination 240 the highest channel gain value 241, corresponding to the channel gain of user 2 is selected, for combination 250 the highest channel gain value 251, corresponding to the channel gain of user 2 is selected, and for combination 260 the highest channel gain value 261, corresponding to the channel gain of user 3 is selected.

The example of FIG. 2 is a simplified scenario for the purposes of illustration. In particular, it will be appreciated that, in some cases, any of the users 1, 2, 3, and 4 may be assigned alone to the channel under consideration, which would lead to four additional candidate user sets. This is equivalent to falling back to a pure orthogonal allocation with only one user per sub-band. This guarantees that the obtained system will not show worse performance than the orthogonal case.

The method of FIG. 1 next proceeds from step 115 to step 120 at which a sub-band attenuation value is determined for each combination of users that may be assigned to the channel under consideration.

Figure 3:
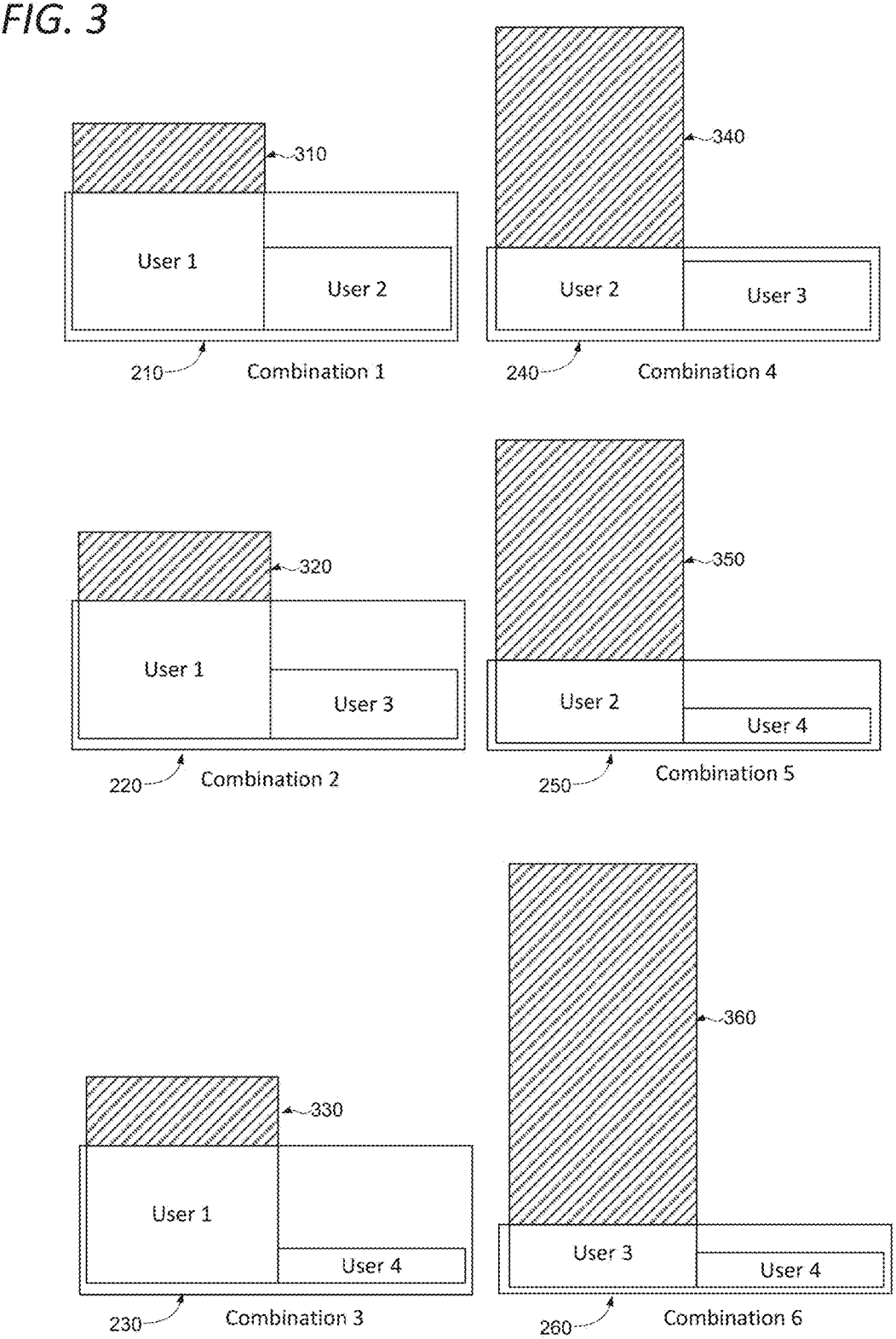
FIG. 3 illustrates the determination of sub-band attenuation values.

FIG. 3 illustrates the determination of sub-band attenuation values.

As shown, each combination of users 210, 220, 230, 240, 250, 260 is illustrated, and in each case a respective sub-band attenuation value 310, 320, 330, 340, 350, 360 is shown. This sub-band attenuation value is, in each case, proportional to the reciprocal of the square of the selected channel gain value selected at step 115, corresponding for each combination to the highest of the channel gain values associated with the users in that combination.

Optionally, the sub-band attenuation value may be equal to the total transmission bandwidth multiplied by the Noise power, divided by the square of said selected channel gain value multiplied by the total number of said sub-bands, or $$\frac{BN_0}{S h_{s,k^*}^2},$$

where $N_0$ is the noise power (equal for all sub-bands) and $h_{s,k^*}$ is the channel gain of the user $k^*$ showing the highest channel gain in a given combination of users on the sub-band currently under consideration, s designates a particular sub-band under consideration, and S is the total number of sub-bands.

The method next proceeds from step 120 to step 125, at which a provisional power assignment is calculated for the carrier under consideration and all other sub-bands to which users have been assigned, for each possible combination of users assignable to the sub-band under consideration. This is calculated using a water filling algorithm across the selected sub-band and every sub-band selected previously, using a floor for each sub-band defined by the respective sub-band attenuation value as determined at step 120.

A waterfilling algorithm may be seen as implicitly ensuring that the total power assigned across the carrier under consideration and all other sub-bands to which users have been assigned is equal to the total power budget, and such that for each sub-band considered thus far the sum of the power provisionally assigned to that sub-band and the sub-band attenuation value of that sub-band is a constant.

Specifically, the waterline level is predicted based on the previous level and the channel gain of the considered user scheduled on the current sub-band.

Maximizing the achieved throughput through an optimal sharing of the total transmit power among sub-bands may then be achieved if:

$$P_s + \frac{N_0 B/S}{h_{s,k^*}^2} = W(S_A(i)), s \in S_A(i) \quad (5)$$

where $S_A(i)$ is the set of allocated sub-bands at allocation stage i, $W(S_A(i))$ the corresponding waterline at stage i, and $h^2_{s;k^*}$ the channel gain of user k showing the highest channel gain among scheduled users on sub-band s.

During the allocation process, the total transmit power $P_{max}$ is distributed, at each stage, among allocated sub-bands based on eq. (5), resulting in:

$$P_{max} = \sum_{s \in S_A(i)} \left( W(S_A(i)) - \frac{N_0 B/S}{h_{s,k^*}^2} \right) \quad (6)$$

Since the same amount of total power is re-distributed each time the scheduler allocates a new sub-band denoted by $s_{new}$, the waterline is updated and represented by $W(SA(i+1))$ only if $$\frac{N_0 B/S}{h_{s_{new},k^*}^2} < W(SA(i)),$$

otherwise it will keep its old value $W(SA(i))$. When the waterline is updated, Pmax is distributed at stage i+1 as follows:

$$P_{max} = \sum_{s \in S_A(i)} \left( W(S_A(i)) - \frac{N_0 B/S}{h_{s,k^*}^2} \right) + \left( W(S_A(i)) - \frac{N_0 B/S}{h_{s_{new},k^*}^2} \right) \quad (7)$$

If N(i) denotes the number of sub-bands in the set SA(i), eq. (6) can be re-written as:

$$P_{max} = N(i) \cdot W(S_A(i)) - \sum_{s \in S_A(i)} \left( W(S_A(i)) - \frac{N_0 B/S}{h_{s,k^*}^2} \right) \quad (8)$$

Hence, by comparing eq. (7) and eq. (8):

$$N(i) \cdot W(S_A(i)) - \sum_{s \in S_A(i)} \frac{\frac{N_0 B}{S}}{h_{s,k^*}^2} = N(i) \cdot W(S_A(i+1)) - \sum_{s \in S_A(i)} \frac{\frac{N_0 B}{S}}{h_{s,k^*}^2} + \left( \left( W(S_A(i+1)) - \frac{\frac{N_0 B}{S}}{h_{s_{new},k^*}^2} \right) \right) \quad (9)$$

Therefore, the waterline at stage i+1 can be formulated as:

$$W(S_A(i+1)) = \frac{1}{N(i)+1} \left( N(i) \cdot W(S_A(i)) + \frac{\frac{N_0 B}{S}}{h_{s_{new},k^*}^2} \right) \quad (10)$$

At each step of the scheduling process, for every candidate user set U, the corresponding waterline level is derived from eq. (10), while taking into account user k showing the highest channel gain among scheduled users in the set U, over sub-band $s_{new}$. Once the waterline level at the actual stage, i+1, is determined, power may then be assigned for each candidate set U as $P_{s_{new}}U$ using:

$$P_{s_{new}|U} = W(S_A(i+1)) - \frac{\frac{N_0 B}{S}}{h^2_{s_{new},k^*|U}} \quad (11)$$

FIG. 4 demonstrates the application of the water filling approach in accordance with the method of FIG. 1 for a first user combination scenario.

As shown in FIG. 4, a calculation is carried out on the basis of a first one of the sub-band attenuation values calculated at step 120. As shown in FIG. 4 a calculation is carried out on the basis of a first sub-band attenuation value 410 corresponding to the values 310, 320 and 330.

As shown in FIG. 4, the sub-band attenuation value of each of the sub-bands (the current sub-band, and the two preceding sub-bands) are illustrated arranged next to each other in order of magnitude, with the sub-band having the lowest sub-band attenuation value on the left, and the sub-band having the highest sub-band attenuation value on the right.

As such, in FIG. 4 the current sub-band with first sub-band attenuation value 410 is situated on the left of the other sub-bands. In accordance with the equations 10 and 11 above, the total power budget can be provisionally distributed amongst the sub-bands such that the power assigned to the carrier under consideration and all other sub-bands to which users have been assigned is equal to the total power budget, and such that for each sub-band the sum of the power provisionally assigned to that sub-band and the sub-band attenuation value of that sub-band is a constant. It will be appreciated that while the water filling algorithm implies distribution of power in the manner described with respect to FIG. 4, the equations mentioned above need not be explicitly resolved to provide a power value for the sub-band under consideration 410 to become available.

Thus, as shown, a first provisional power allocation 401 is made to the sub-band currently under consideration, a second provisional power allocation 402 is implied for sub-band 1, and a third provisional power allocation 403 is implied for the sub-band 2, such that in each case the sum of each provisional power allocation with the corresponding sub-band attenuation value would be equal to a constant value 404, and the sum of the three values 401, 402, 403 is equal to the total transmission power budget.

This approach is analogous to filling a vessel with an uneven floor (as dictated by the different sub-band attenuation values) with water. Given a particular volume of water, corresponding to the total transmission power budget, it will naturally find its own level, whereby the depth at any point indicates the power allocation for the underlying sub-band.

This represents a rational mechanism for power distribution since it makes sense to invest the most power in the sub-band with the highest channel gain, and thus the lowest sub-band attenuation value, since allocating on this basis ensures the highest possible total throughput rates.

Figure 5:
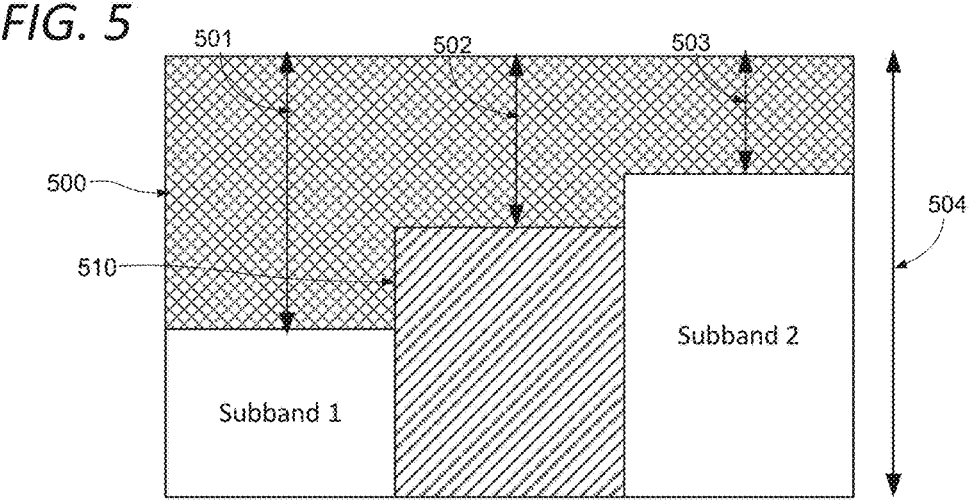
FIG. 5 demonstrates the application of the water filling approach in accordance with the method of FIG. 1 for a second user combination scenario.

FIG. 5 demonstrates the application of the water filling approach, in accordance with the method of FIG. 1, for a second user combination scenario.

As shown in FIG. 5, a calculation is carried out on the basis of a second one of the sub-band attenuation values calculated at step 120. As shown in FIG. 5, a calculation is carried out on the basis of a second sub-band attenuation value 510 corresponding to the values 340 and 350.

As shown in FIG. 5, the sub-band attenuation value of each of the sub-bands (the current sub-band, and the two preceding sub-bands) are illustrated arranged next to each other in order of magnitude, with the sub-band having the lowest sub-band attenuation value on the left, and the sub-band having the highest sub-band attenuation value on the right.

As such, in FIG. 5, the current sub-band with second sub-band attenuation value 510 is situated between the other two sub-bands. In accordance with the equations 10 and 11 above, the total power budget can be provisionally distributed amongst the sub-bands such that the power assigned to the carrier under consideration and all other sub-bands to which users have been assigned is equal to the total power budget, and such that, for each sub-band, the sum of the power provisionally assigned to that sub-band and the sub-band attenuation value of that sub-band is a constant. As for FIG. 4, it will be appreciated that, while the water filling algorithm implies distribution of power in the manner described with respect to FIG. 5, the equations mentioned above need not be explicitly resolved to provide power value for the sub-band under consideration 510

Thus, as shown, a first provisional power allocation 501 is implied for sub-band 1, a second provisional power allocation 502 is made to the sub-band currently under consideration, and a third provisional power allocation 503 is implied for the sub-band 2, such that in each case the sum of each provisional power allocation with the corresponding sub-band attenuation value would be equal to a constant value 504, and the sum of the three values 501, 502, 503 is equal to the total transmission power budget.

Figure 6:
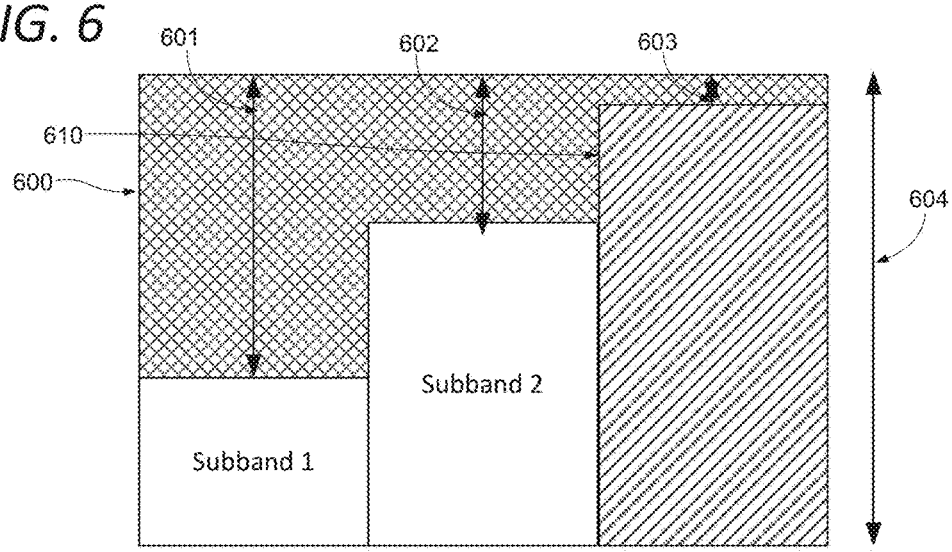
FIG. 6 demonstrates the application of the water filling approach in accordance with the method of FIG. 1 for a second user combination scenario.

FIG. 6 demonstrates the application of the water filling approach in accordance with the method of FIG. 1 for a second user combination scenario.

As shown in FIG. 6, a calculation is carried out on the basis of a second one of the sub-band attenuation values calculated at step 120. As shown in FIG. 6 a calculation is carried out on the basis of a second sub-band attenuation value 610 corresponding to the value 360.

As shown in FIG. 6, the sub-band attenuation value of each of the sub-bands (the current sub-band, and the two preceding sub-bands) are illustrated arranged next to each other in order of magnitude, with the sub-band having the lowest sub-band attenuation value on the left, and the sub-band having the highest sub-band attenuation value on the right.

As such, in FIG. 6, the current sub-band with second sub-band attenuation value 610 is situated between the other two sub-bands. In accordance with the equations 10 and 11 above, the total power budget can be provisionally distributed amongst the sub-bands such that the power assigned to the carrier under consideration and all other sub-bands to which users have been assigned is equal to the total power budget, and such that for each sub-band the sum of the power provisionally assigned to that sub-band and the sub-band attenuation value of that sub-band is a constant. As for FIG. 4, it will be appreciated that while the water filling algorithm implies distribution of power in the manner described with respect to FIG. 6, the equations mentioned above need not be explicitly resolved to provide power value for the sub-band under consideration 610.

Thus, as shown, a first provisional power allocation 601 is implied for sub-band 1, a second provisional power allocation 602 is implied for the sub-band 2, and a third provisional power allocation 603 is made to the sub-band currently under consideration, such that in each case the sum of each provisional power allocation with the corresponding sub-band attenuation value would be equal to a constant value 604, and the sum of the three values 601, 602, 603 is equal to the total transmission power budget.

Thus taking FIGS. 4, 5 and 6 together, each of the possible combination scenarios and respective associated sub-band attenuation values is considered to obtain provisional power allocations for each sub-band in each scenario.

The method now proceeds from step 125 to step 130, at which a combination of users is selected from those considered at step 125.

The determination of throughput values is now possible due to the availability of provisional power allocation values.

Specifically, a performance metric value is determined for the sub-band under consideration with each possible combination of users assignable to the sub-band under consideration, on the basis of the respective provisional power allocation determined for the sub-band under consideration with each said possible combination of users assignable to the sub-band under consideration as determined at step 125.

A variety of performance metrics may be appropriate. Suitable performance metrics may be based on throughput predictions on the basis of transmission power allocations. Performance metrics based on fairness may also be suitable. Still further, metrics based on both fairness and throughput may also be appropriate, such as the Proportional Fairness calculation presented above or variants thereof. In applications where fairness maximization is not required, historical rates could be eliminated from the PF metric. The decision metric might then be only based on throughput maximization.

Another possibility is to use capacity limits (formula 1) to predict throughputs using formula 3 and estimate a Proportional Fairness metric as in formula 4.

Accordingly, $P_{s_{new}}U$ is shared among scheduled users in the set U based on Fractional Transmit Power Allocation (FTPA), the scheduling PF metric is calculated. Alternative power repartition mechanisms can also be used, such as a full search power allocation (FSPA) or a fixed power allocation (FPA) as described by Y. Saito, A. Benjebbour, Y. Kishiyama, and T. Nakamura. In "System-level Performance Evaluation of Downlink Non-orthogonal Multiple Access (NOMA). Personal Indoor and Mobile Radio Communications" (PIMRC), pp. 611-615, 2013.

This calculation is performed for each combination of users, and whichever combination offers the best throughput with the provisional power allocation determined for that combination is selected for definitive assignment to the sub-band under consideration.

Power estimation using equation 11 is only needed at sub-band $s_{new}$, in order to choose the best candidate user set. Powers on the previously allocated sub-bands do not need to be re-estimated at each stage. Power allocation is done only once at the end of the scheduling process (after all sub-bands have been attributed), using the final waterline level, to yield the final users' power levels on all sub-bands.

Thereby, at step 130, whichever combination of users provides the best performance metric value is assigned to said sub-band under consideration.

Finally, at step 135, it is determined whether all sub-bands in the NOMA system have been considered for the assignment of users and allocation of power in accordance with steps 110 to 130 above, and in a case where at least one sub-band has yet to be considered, the method reverts to step 105, at which a new sub-band is selected from those yet to be considered. Otherwise, the method proceeds to step 140 at which a final power allocation for each sub-band is calculated from the last iteration of the water filling algorithm corresponding to the combination of users selected for each said sub-band before terminating at step 145.

It will be appreciated that, while the method of FIG. 1 suggests a parallel processing of the different user combination scenarios in steps 110 to 125, it would be entirely equivalent for any or all of the steps of selecting the channel gain value, determining a sub-band attenuation value, calculating a provisional power assignment, determining a performance metric, to be carried out in sequence for one user combination scenario at a time, and looping back to repeat the same steps for each user combination scenario until all user combination scenarios have been considered.

It will also be appreciated that, while application of the waterfilling algorithm across the sub-bands for which provisional or definitive user attributions are available implies a power attribution for each sub-band, this is not necessarily converted into an actual power value for each sub-band. Implementation of the steps of FIG. 1 only require that an actual power value be available for the sub-band under consideration. Definitive power values may then be obtained for all sub-bands, once definitive user attributions have been made, i.e., on the basis of the waterfilling algorithm as performed for the user combination for the last sub-band to be considered. Nevertheless, it is also possible for power values to be obtained each time the waterfilling algorithm is carried out, or each time a combination of users is definitively assigned to a sub-band on the basis of a series of iterations of the waterfilling algorithm.

As such, at the step of calculating a provisional power allocation from the water filling algorithm for the selected sub-band, a provisional power allocation may be further calculated for each sub-band selected previously from the water filling algorithm.

Alternatively, after the step of attributing to the selected sub-band whichever combination of users optimises the performance metric; the method may comprise a further step of calculating a provisional power allocation for each sub-band selected previously from the water filling algorithm corresponding to the combination of users selected for each sub-band.

Figure 7:
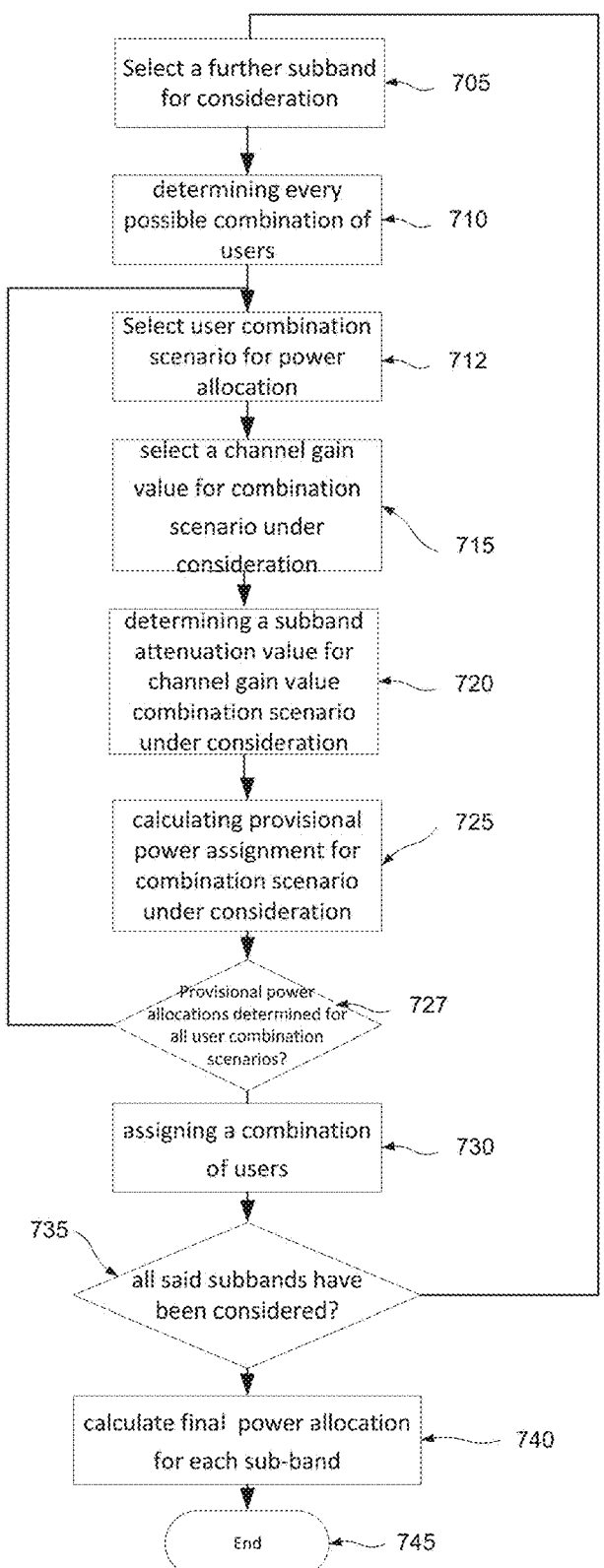
FIG. 7 shows a method implementing a sequential processing of combination scenarios.

FIG. 7 shows a method implementing a sequential processing of combination scenarios.

As shown in FIG. 7, steps 700, 705, 710 correspond to steps 100, 105, 110 of FIG. 1. Once the possible combinations of users are determined at step 710 however, one of these user combination scenarios is selected for consideration. Accordingly at steps 715, 720 and 725, the steps of selecting the channel gain value, determining a sub-band attenuation value, calculating a provisional power assignment, and determining a performance metric value are performed for the single scenario under consideration. At step 727, the method determines whether further scenarios remain to be considered, and in a case where all scenarios have been considered, the method proceeds to assign a combination of users to the sub-band under consideration at step 730. Otherwise, the method loops back to step 712 of selecting a new scenario for consideration. It will be appreciated that various hybrid arrangements of sequential and parallel processing are possible, for example step 727 could be situated between steps 720 and 725, or between steps 715 and 720, and so on.

Steps 730, 735, 740 and 745 then proceed correspondingly to steps 130, 135, 140 and 145 as described above.

It will be appreciated that for the first sub-band to be considered, the method may be simplified, since the waterfilling calculation at step 125 is unnecessary—power does not need to be divided amongst a number of sub-bands, since at this stage only one sub-band is under consideration. Accordingly, in this first iteration, the available power budget may simply be allocated directly to the sub-band under consideration without further calculation.

Figure 8:
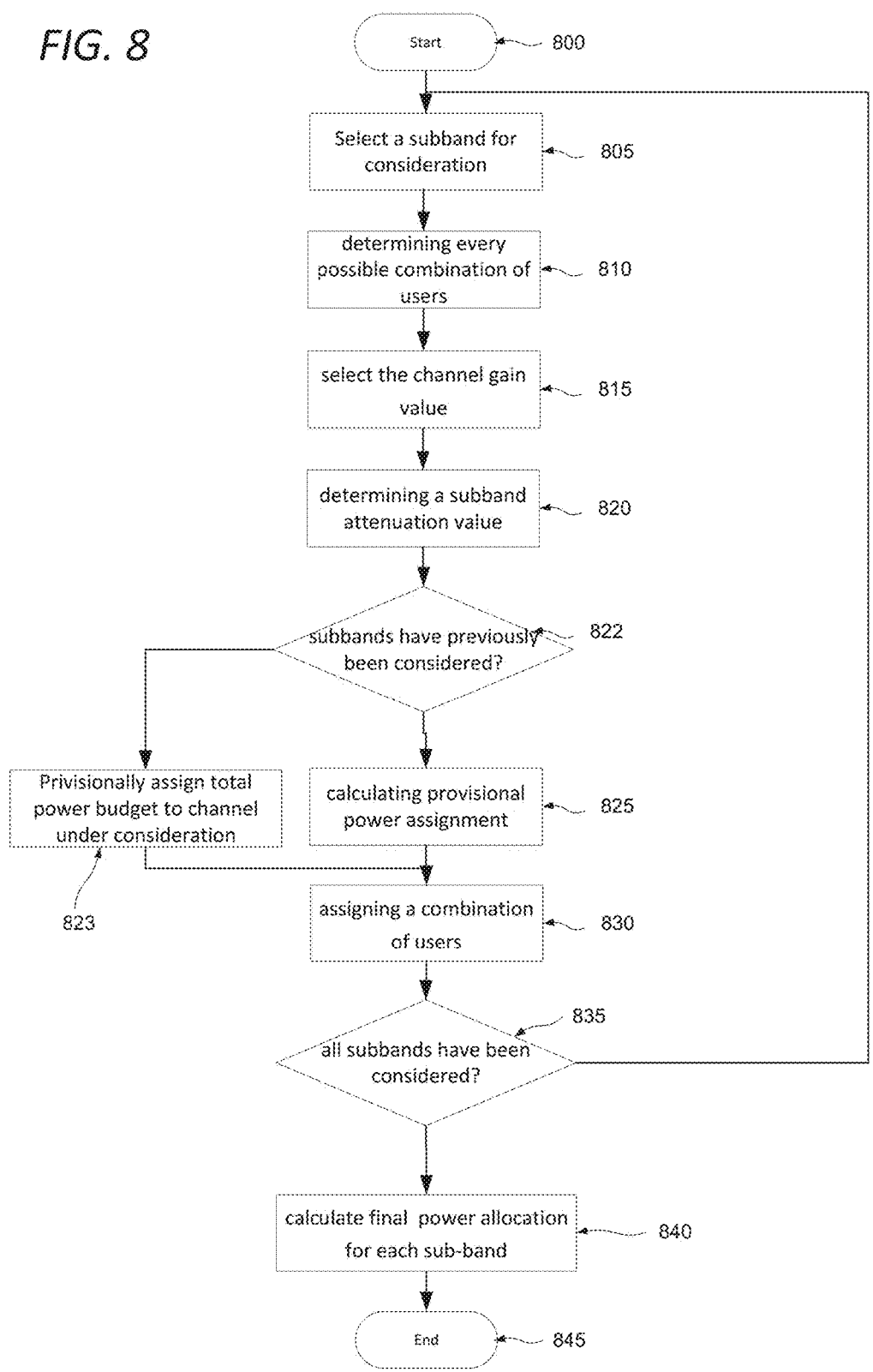
FIG. 8 shows a method with a simplified first iteration.

FIG. 8 shows a method with a simplified first iteration.

As shown in FIG. 8, steps 800, 805, 810, 815, 820, 825, 830, 835, 840 correspond to steps 100, 105, 110, 115, 120, 125, 130, 135, 140 of FIG. 1, respectively. As shown, after step 820 at which a sub-band attenuation value is obtained, the method considers whether any sub-bands have been considered in previous iterations or not, or in other words, whether the sub-band under consideration is the first sub-band to be thus considered. Where this is determined to be the case, the method proceeds via step 823 instead of 825, and provisionally assigns the entire power budget the channel under consideration, before resuming at step 830.

Steps 830, 835, 840 and 845 then proceed correspondingly to steps 130, 135, 140 and 145 as described above.

It will be appreciated that many of the steps of FIGS. 1, 7 and 8 may be performed in alternative sequences, without modifying the desired technical effect. For example, sub-band attenuation values may be determined once and for all users early in the process, bearing in mind that for a given combination of users, the attenuation values depend on the considered sub-band, while the combinations of users (e.g. combinations 1+2, 1+3, 1+4, 2+3, 2+4, 3+4) do not depend on the considered sub-band although the corresponding gains and attenuation do, and then retrieved for application once the user with the highest channel gain value in a particular user combination is identified at steps 115, 715, 815.

The disclosed methods can take form of an entirely hardware embodiment (e.g. FPGA), an entirely software embodiment (for example to control a system according to the invention) or an embodiment containing both hardware and software elements. Software embodiments include but are not limited to firmware, resident software, microcode, etc. The invention can take the form of a computer program product accessible from a computer-usable or computer-readable medium providing program code for use by or in connection with a computer or an instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

Accordingly, a mechanism is proposed based on iteratively applying a waterfilling algorithm to distribute power across a progressive subset of sub-bands to provisionally distribute the power budget across that subset of sub-bands, where at each iteration the water filling algorithm is carried out for each possible combination of users assignable to the newly considered sub-band using a floor for that sub band proportional to the reciprocal of the square of the highest channel gain value of any user in that combination, and calculating a throughput for that combination with the corresponding power attribution, whereby the combination retained for the next iteration (with an additional sub-band) is whichever optimises a performance metric. This process is thus repeated until users are assigned to all sub-bands, whereupon a definitive power allocation is calculated from the last iteration of the water filling algorithm.

These methods and processes may be implemented by means of computer-application programs or services, an application-programming interface (API), a library, and/or other computer-program product, or any combination of such entities.

Figure 9:
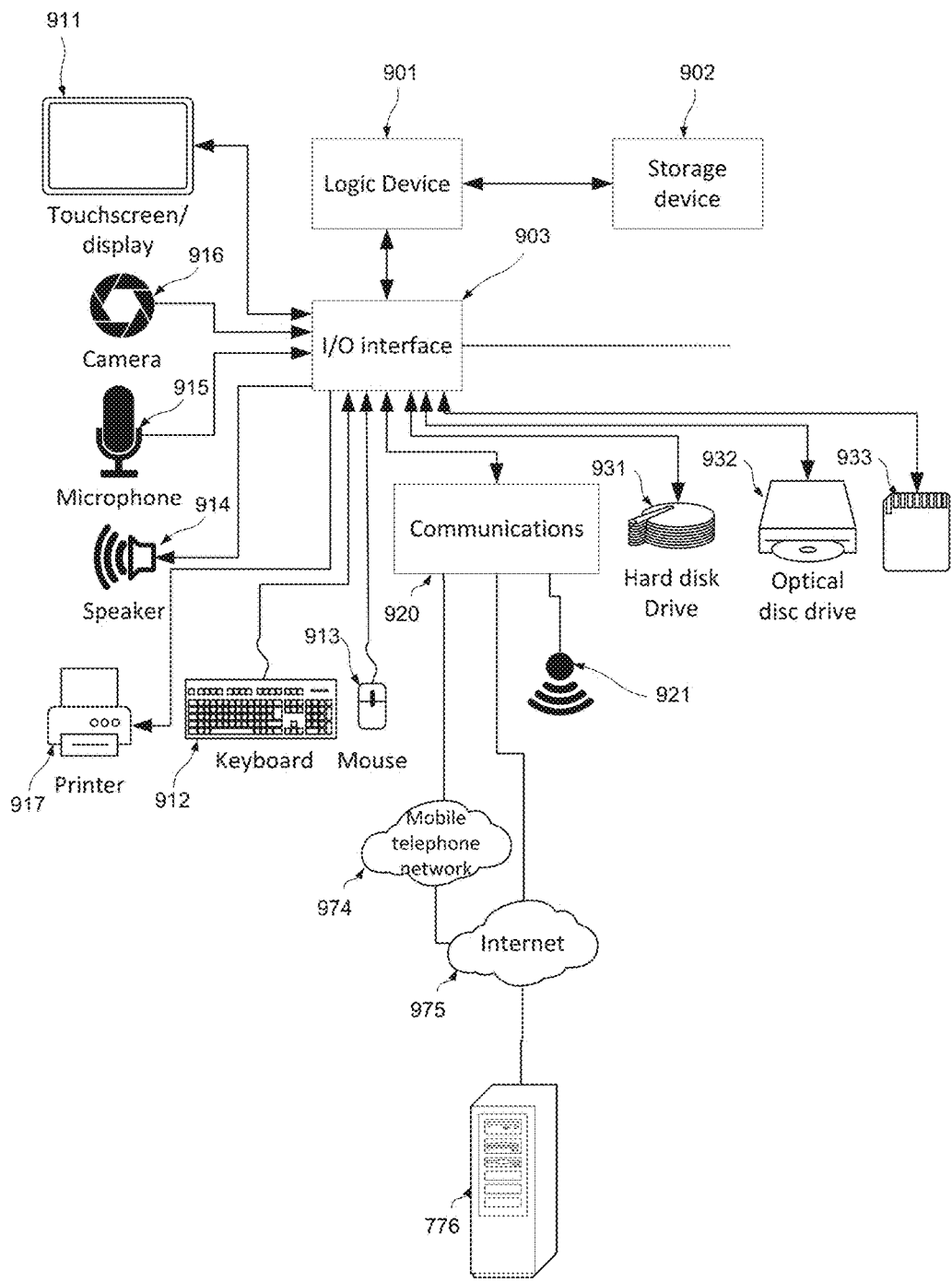
FIG. 9 shows a generic computing system suitable for implementation of embodiments of the invention.

FIG. 9 shows a generic computing system suitable for implementation of embodiments of the invention.

As shown in FIG. 9, a system includes a logic device 901 and a storage device 902. The system may optionally include a display subsystem 911, input/output subsystem 903, communication subsystem 920, and/or other components not shown.

Logic device 901 includes one or more physical devices configured to execute instructions. For example, the logic device 901 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device 901 may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device 901 may optionally be distributed among two or more separate devices, which may be remotely located and/or configured for coordinated processing. Aspects of the logic device 901 may be virtualized and executed by remotely accessible, networked computing devices configured in a cloud-computing configuration.

Storage device 902 includes one or more physical devices configured to hold instructions executable by the logic device to implement the methods and processes described herein. When such methods and processes are implemented, the state of storage 902 device may be transformed—e.g., to hold different data.

Storage device 902 may include removable and/or built-in devices. Storage device 902 may comprise one or more types of storage device including optical memory (e.g., CD, DVD, HD-DVD, Blu-Ray Disc, etc.), semiconductor memory (e.g., FLASH, RAM, EPROM, EEPROM, etc.), and/or magnetic memory (e.g., hard-disk drive, floppy-disk drive, tape drive, MRAM, etc.), among others. Storage device may include volatile, nonvolatile, dynamic, static, read/write, read-only, random-access, sequential-access, location-addressable, file-addressable, and/or content-addressable devices.

In certain arrangements, the system may comprise an I/O interface 903 adapted to support communications between the Logic device 901 and further system components. For example, additional system components may comprise removable and/or built-in extended storage devices. Extended storage devices may comprise one or more types of storage device including optical memory 932 (e.g., CD, DVD, HD-DVD, Blu-Ray Disc, etc.), semiconductor memory 933 (e.g., FLASH RAM, EPROM, EEPROM, FLASH etc.), and/or magnetic memory 931 (e.g., hard-disk drive, floppy-disk drive, tape drive, MRAM, etc.), among others. Such extended storage device may include volatile, nonvolatile, dynamic, static, read/write, read-only, random-access, sequential-access, location-addressable, file-addressable, and/or content-addressable devices.

It will be appreciated that storage device includes one or more physical devices, and excludes propagating signals per se. However, aspects of the instructions described herein alternatively may be propagated by a communication medium (e.g., an electromagnetic signal, an optical signal, etc.), as opposed to being stored on a storage device.

Aspects of logic device 901 and storage device 902 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system implemented to perform a particular function. In some cases, a program may be instantiated via logic device executing machine-readable instructions held by storage device. It will be understood that different modules may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

In particular, the system of FIG. 9 may be used to implement one or several embodiments of the invention.

For example, a program implementing the steps described with respect to FIG. 1, 7 or 8 may be stored in storage device 902 and executed by logic device 901. The channel gain values, sub-band attenuation values, user combinations or power assignments may be buffered in the storage device 902. The Logic device 901 may implement the steps as described above under the control of a suitable program, in particular the Waterfilling and Proportional Fairness calculations described above, or may interface with internal and/or external dedicated systems adapted to perform some or all of these processes such as hardware accelerated encoders/decoders and the like. Furthermore, a program may implement a NOMA transmitter implementing power allocation in accordance with embodiment(s) as described above for example. These tasks may be shared among a number of computing devices, for example as described with reference to FIG. 9. The encoded signal may be received via the communications interface 920.

Accordingly, the invention may be embodied in the form of a computer program.

It will be appreciated that a "service", as used herein, may be an application program executable across multiple user sessions. A service may be available to one or more system components, programs, and/or other services. In some implementations, a service may run on one or more server-computing devices.

When included, display subsystem 911 may be used to present a visual representation of the first video stream, the second video stream or the combined video stream, or may otherwise present statistical information concerning the processes undertaken. As the herein described methods and processes change the data held by the storage device 902, and thus transform the state of the storage device 902, the state of display subsystem 911 may likewise be transformed to visually represent changes in the underlying data. Display subsystem 911 may include one or more display devices utilizing virtually any type of technology. Such display devices may be combined with logic device and/or storage device in a shared enclosure, or such display devices may be peripheral display devices.

When included, input subsystem may comprise or interface with one or more user-input devices such as a keyboard 912, mouse 913, touch screen 911, or game controller (not shown). In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, colour, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 920 may be configured to communicatively couple computing system with one or more other computing devices. For example, communication module of may communicatively couple computing device to remote service hosted for example on a remote server 976 via a network of any size, including for example a personal area network, local area network, wide area network, or the internet. Communication subsystem may include wired and/or wireless communication devices compatible with one or more different communication protocols. As non-limiting examples, the communication subsystem may be configured for communication via a wireless telephone network 974, or a wired or wireless local- or wide-area network. In some embodiments, the communication subsystem may allow computing system to send and/or receive messages to and/or from other devices via a network such as the Internet 975. The communications subsystem may additionally support short range inductive communications 921 with passive devices (NFC, RFID etc).

Figure 10:
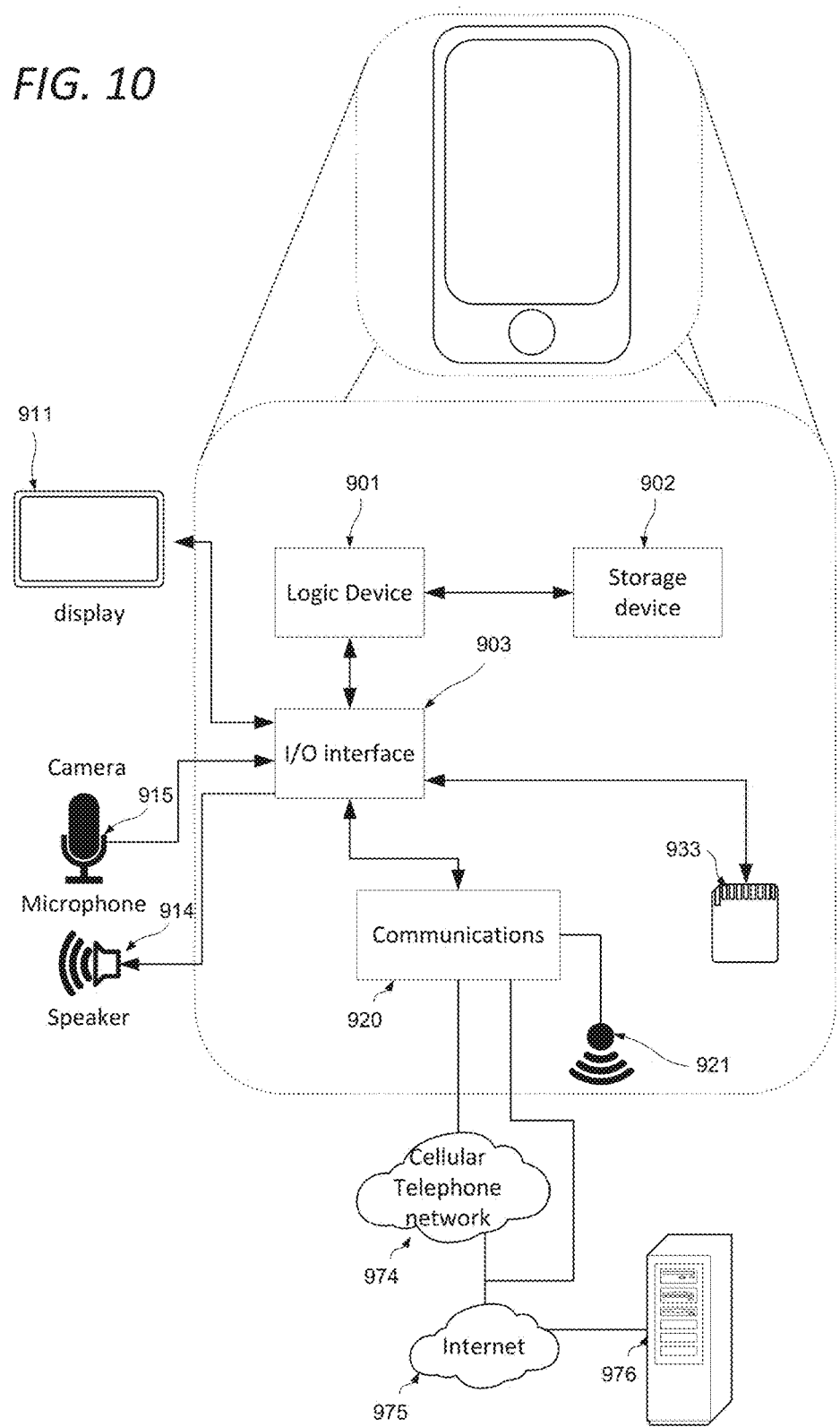
FIG. 10 shows a smartphone device adaptable to constitute an embodiment.
Figure 11:
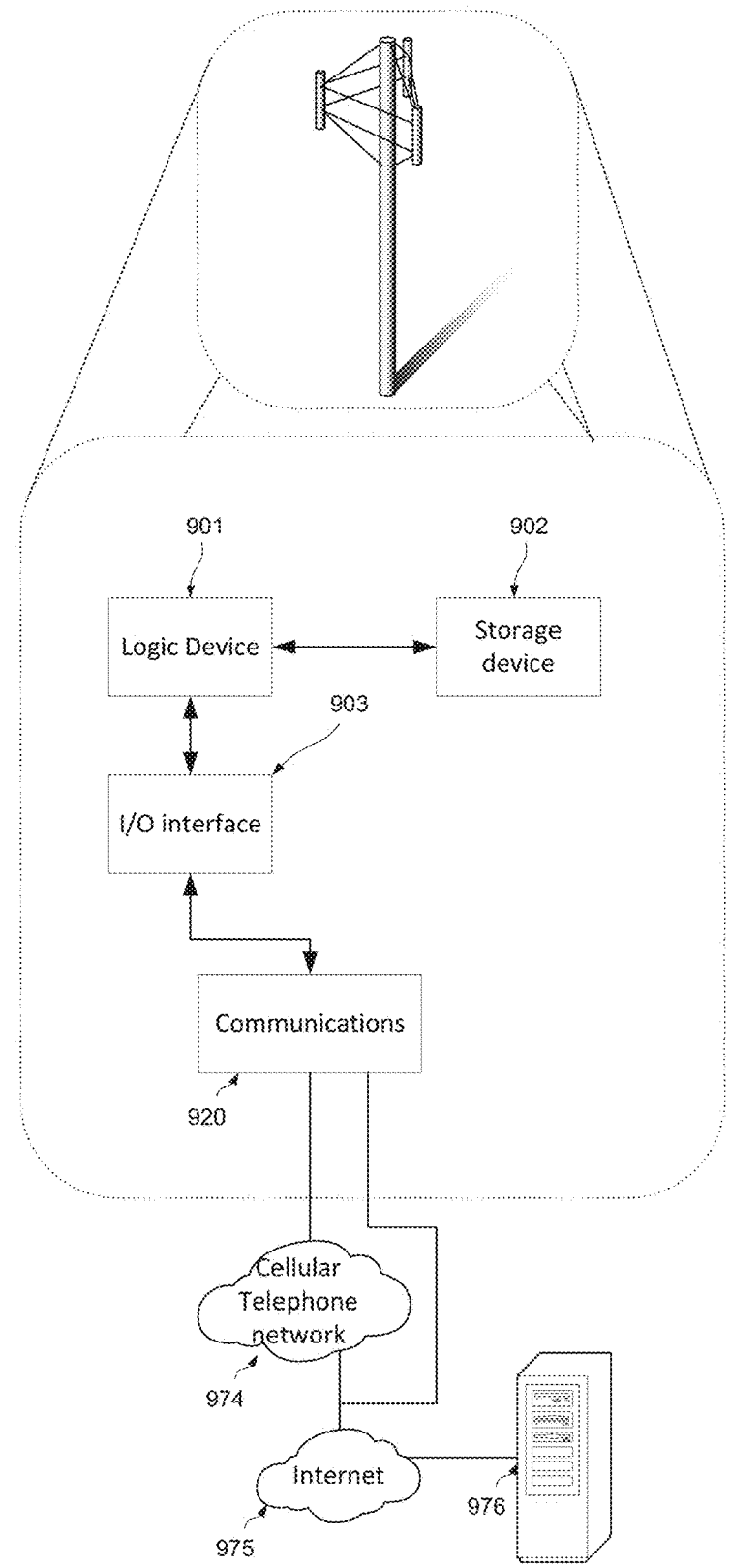
FIG. 11 shows a cellular network base station adaptable to constitute an embodiment.

FIG. 10 shows a smartphone device configured to constitute an embodiment. As shown in FIG. 10, the smartphone device incorporates elements 901, 902, 903, 920, near field communications interface 921, flash memory 933, elements 914, 915, and 911 as described above. It is in communication with the telephone network 974 and/or a server 976 via the network 975. Alternative communication mechanisms such as a dedicated network or WiFi may also be used. 101351 FIG. 11 shows a cellular network base station adaptable to constitute an embodiment. As shown in FIG. 11, the cellular network base station incorporates elements 901, 902, 903, and 920 as described above. It is in communication with the telephone network 974 and/or a server 976 via the network 975. Alternative communication mechanisms such as a dedicated network or WiFi may also be used.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A transmitter comprising a device for distributing a transmission power budget amongst a plurality of sub-bands in a transmission system, said device being adapted to:
   select one said sub-band for consideration,
   determine every possible combination of users assignable to said sub-band under consideration;
   assess each said possible combination of users assignable to the sub-band under consideration
      to select the channel gain value of the user in that combination having the highest channel gain,
      to determine a sub-band attenuation value proportional to the reciprocal of the square of said selected channel gain value;
      to apply a water filling algorithm across said selected sub-band and every sub-band selected previously using a floor for each said sub-band defined by the respective said sub-band attenuation value,
      to calculate a provisional power allocation from said water filling algorithm for said selected sub-band, and
      to calculate a performance metric with said provisional power attribution;
   and to attribute to said selected sub-band whichever said combination of users optimises said performance metric;
   said device being further adapted to then select a further said sub-band and to repeat said operations of:
      assess each said possible combination of users assignable to said sub-band under consideration; and
      attributing to said sub-band whichever said combination of users optimises said performance metric;
   until all said sub-bands have been considered, and to
   calculate a final power allocation for each said sub-band from the last iteration of the water filling algorithm corresponding to the combination of users selected for each said sub-band; and
   said transmitter transmitting data corresponding to each attributed user at a respective corresponding power level.

2. A method of distributing a transmission power budget amongst a plurality of sub-bands in a transmission system, said method comprising the steps of:
   selecting one said sub-band for consideration;
   determining every possible combination of users assignable to said sub-band under consideration;
   assessing each said possible combination of users assignable to the sub-band under consideration
      to select the channel gain value of the user in that combination having the highest channel gain,
      to determine a sub-band attenuation value proportional to the reciprocal of the square of said selected channel gain value,
      to apply a water filling algorithm across said selected sub-band and every sub-band selected previously using a floor for each said sub-band defined by the respective said sub-band attenuation value,
      to calculate a provisional power allocation from said water filling algorithm for said selected sub-band, and
      to calculate a performance metric with said provisional power attribution; and
   attributing to said selected sub-band whichever said combination of users optimises said performance metric;
   said method comprising the further steps of selecting a further said sub-band and repeating said steps of
   assessing for each said possible combination of users; and
   attributing to said sub-band whichever said combination of users optimises said performance metric;
   until all said sub-bands have been considered, and
   calculating a final power allocation for each said sub-band from the last iteration of the water filling algorithm corresponding to the combination of users selected for each said sub-band; and
   transmitting data corresponding to each attributed user at a respective corresponding power level.

3. The method of claim 2 wherein at said step of calculating a provisional power allocation from said water filling algorithm for said selected sub-band, a provisional power allocation is further calculated for each sub-band selected previously from said water filling algorithm.

4. The method of claim 2 wherein after said step of attributing to said selected sub-band whichever said combination of users optimises said performance metric; said method comprises a further step of calculating a provisional power allocation for each sub-band selected previously from said water filling algorithm corresponding to the combination of users selected for each said sub-band.

5. The method of claim 2 in which said sub-band attenuation value is equal to the total transmission bandwidth multiplied by the Noise power spectral density, divided by the square of said selected channel gain value multiplied by the total number of said sub-bands.

6. The method of claim 2 in which said performance metric is a throughput value or a fairness metric or a combination of both throughput and fairness metric.

7. The method of claim 2 wherein in a first iteration of said steps of:
   determining every possible combination of users,
   selecting the channel gain value,
   determining every possible combination of users,
   assessing for each said possible combination of users; and
   attributing to said sub-band whichever said combination of users optimises said performance metric;
   at said step of assessing, the total power budget is assigned to the sub-band under consideration for each said possible combination of users assignable to the sub-band under consideration.

8. An apparatus adapted to implement the steps of claim 2.

9. A computer program stored in a non-transitory computer storage medium and when executed by at least one processor implements the steps of claim 2.

* * * * *